United States Patent
Acimovic

(10) Patent No.: US 7,812,693 B1
(45) Date of Patent: Oct. 12, 2010

(54) LOWPASS-BANDSTOP COMMON MODE FILTER FOR DIFFERENTIAL LINES CARRYING HIGH RATE DIGITAL SIGNALS

(75) Inventor: Predrag Acimovic, Burnaby (CA)

(73) Assignee: PMC-Sierra US, Inc., Santa Clara, CA (US)

( * ) Notice: Subject to any disclaimer, the term of this patent is extended or adjusted under 35 U.S.C. 154(b) by 92 days.

(21) Appl. No.: 12/038,503

(22) Filed: Feb. 27, 2008

Related U.S. Application Data

(60) Provisional application No. 60/892,030, filed on Feb. 28, 2007.

(51) Int. Cl.
*H04B 3/20* (2006.01)
*H01P 3/08* (2006.01)

(52) U.S. Cl. .......... 333/204; 333/12
(58) Field of Classification Search .......... 333/12, 333/181, 185, 202, 204
See application file for complete search history.

(56) References Cited

U.S. PATENT DOCUMENTS

| | | | | | |
|---|---|---|---|---|---|
| 3,963,990 | A | * | 6/1976 | DiFonzo | 455/304 |
| 4,561,067 | A | * | 12/1985 | McKeown | 708/813 |
| 5,077,543 | A | * | 12/1991 | Carlile | 333/177 |
| 5,247,269 | A | * | 9/1993 | Boulouard et al. | 333/126 |

* cited by examiner

*Primary Examiner*—Robert Pascal
*Assistant Examiner*—Kimberly E Glenn
(74) *Attorney, Agent, or Firm*—Leslie A. Kinsman; Borden Ladner Gervais LLP

(57) ABSTRACT

The present invention provides a novel structure that can be used to make a common mode filter. Only the common mode will be attenuated and the differential mode will not be attenuated. This structure can be implemented in a number of ways, a specific embodiment using strip-line and slot-line junctions is very compact and well-suited to use with multilayer PCBs, and does not require any extra components. It can be designed to attenuate certain discrete frequencies, by designing the poles of the transfer function to be at these frequencies.

15 Claims, 12 Drawing Sheets

$$A - B = Vpos \cdot e^{i \cdot \alpha} - Vneg \cdot e^{i \cdot \alpha} = (Vpos - Vneg) \cdot e^{i \cdot \alpha}$$
$$A + B = 0$$

LOWPASS-BANDSTOP COMMON MODE FILTER FOR DIFFERENTIAL LINES CARRYING HIGH RATE DIGITAL SIGNALS

CROSS-REFERENCE TO RELATED APPLICATIONS

The present application claims the benefit of U.S. Provisional Application No. 60/892,030, filed Feb. 28, 2007, the contents of which are incorporated herein by reference in their entirety.

FIELD OF THE INVENTION

The present invention relates generally to differential data transmission. More particularly, the present invention relates to common mode filtering of signals transmitted over differential transmission lines.

BACKGROUND OF THE INVENTION

Technological advances over the last decades have increased the use of electronic devices in many areas of everyday life. The space around people, almost in any area of the world, is immersed in a variety of emitted electro-magnetic waves. These electro-magnetic (EM) emissions vary in power and frequency. Some devices, such as cell phones, claim the spectrum as part of their intended operation. Some devices, like computers and displays, radiate unwanted emissions that can compromise the operation of other electronic devices. These EM emissions can be particularly harmful if they cause malfunctions of devices, such as pacemakers, and airplane navigation or instrument landing equipment.

In the United States, the Federal Communications Commission (FCC) regulates the amount of radiated emissions according to the class of a device. Class A targets industrial environments and class B targets residential environments. Class A devices have a more relaxed specification than class B. Another class, for open-box equipment, has slightly less stringent specifications than the permitted emissions from packaged products.

Electro-magnetic interference (EMI) requirements are often overlooked by product engineering at the specification phase, and are often an afterthought when the equipment does not meet the specification. This can lead to very expensive last moment shielding or re-design, which is clearly undesirable. Likewise, many designs rely on over-designed and heavy shielding, which is not a viable option in many devices, such as open-box equipment.

The increased data storage and fast access to data in the modern information technology world has increased the demand for high-speed data transfer. There are numerous reasons why the data needs to be transferred at high speed between the integrated chips on one electronic printed circuit board (PCB), between the PCBs within a specific piece of electronic equipment, or even between different pieces of electronic equipment. The data transfer can occur over different media, such as optical fiber or copper wire, or wirelessly. Optical fiber has distinct advantages of a large throughput and no significant EMI to other electronic equipment. But the price for such data transmission devices, and fiber itself, is still quite high. Wireless means of data transfer are very popular, and have many advantages, but the transmission suffers from smaller bandwidth than fiber or wire-bound transmission. Equipment manufacturers prefer to use wire-bound data transfer because it is cheaper than optical data transfer components and wireless components, and offers reasonable bit error rates (BER) and high information capacity.

The use of high-speed data links is replacing data transfer over a bus where a number of slower speed digital signals were used. The use of a bus is acceptable for fast data transfer within a PCB, but between different PCBs it is much more suitable to use high-speed links, because a bus requires connectors with large number of pins to carry a large number of signals. Also, a large number of signals cannot usually be sent differentially and sending signals single-ended usually causes more radiation or more signal distortion. Typical high-speed interfaces in use today include high speed Universal Serial Bus (USB), Fiber-channel, Infiniband, SATA, SAS, and Gigabit Ethernet. These high-speed interfaces start from half a Gigabit per second (Gb/sec) and are now offering more than 6 Gb/sec data rates, with the future information rates of over the 10 Gb/s on single high-speed input/output (HSIO) devices expected. Each of these interfaces uses differential signal lines to carry high-speed digital data.

Signals are generated at a transmit input/output (IO) and pass through the PCB on which IO is residing to some kind of connector. The connector enables the signals to be carried over cables or the backplane to another PCB that contains the receiver IO. Differential signaling has several advantages over single ended signaling. Although the differential signal uses two conductors to convey the signal from the transmitter to the receiver, the signal at the receiver is more immune to the various noise sources, as the noise sources affect both conducting lines that carry the signal in a similar fashion. Thus, the difference between the signal waveforms does not contain the effects of the noise sources. Sometimes the output signals can be deterministic; this means that there is no message that needs to be sent over the lines. This is the case when a clock or some sort of pseudo-random sequence (PRBS) is sent in order to keep some circuits working. The EMI specifications need to be satisfied for these signals as well.

FIG. 1 shows why transmission lines that carry only differential signals have reduced EM radiation. The system of FIG. 1 includes an IO driver 40, a differential transmission line 42 and a termination load 44. Ampere's Law specifies the total current enclosed by the line integral of magnetic intensity vector H over some closed contour.

$$I_{total} = \oint_{Closed\_Contour} \vec{H} \cdot d\vec{l}$$

So, in case of a differential signal, where i1=−i2, the total current $I_{total}$ is equal to zero, and the magnetic intensity H is equal to zero. Hence, in an ideal differential transmission line there are no EM emissions. If the two signal paths following each other closely and the net sum of current in the two conductors is zero, then there is no radiation.

However, differential signal lines also carry a common mode signal. The common mode signal is referenced to ground and the ground does not follow the signal path as closely as the two signal paths that carry the differential signal follow each other. This is shown in FIG. 2. The common mode current loop 46, which has a return path to ground, causes undesirable EMI if i1<>i2. The larger the physical size of the loop 46, the more radiation can be expected.

The common mode signal on the two differential lines is defined as the average of the two signals. If the two differential signals are biased and above the DC, which usually is the case if the high-speed transmitter uses only positive power supply voltage, the common mode signal has a DC component. The DC component can be easily blocked by using series capacitors, so many high speed data transmission interface standards specify use of series blocking capacitors. However, higher frequencies common modes need to be blocked as close as possible to the source to minimize the size of the common mode loop. The common mode can result in radiation at discrete frequencies related to multiples of the symbol rate. These discrete frequencies are especially harmful and they are the usual reason a device does not meeting the EMI requirements. Therefore, some means of reducing or filtering the common mode is required.

One way to reduce the common mode radiation is to modulate the clock that clocks out the data with low frequency modulation using spread spectrum clocking (SSC). This spreads the spectrum of the clock, while at the same time spreading the discrete frequencies due to the common mode. A problem with this kind of EMI reduction is that modulation has to be relatively wide, and, although the receive clock recovery phase lock loop (PLL) can handle it, there can be a problem with first-in-first-out (FIFO) under/over-flow.

Another way to reduce common mode radiation is to filter the common mode. Care must be taken not to distort the differential signal. The most common way of implementing common mode filtering is use of the common mode chokes. Known approaches use ferrite based common mode chokes. The common mode chokes, based on a high level of magnetic coupling, present a high impedance for common mode and they are broad-band. However, they cannot achieve more than 10 to 15 dB of attenuation in the frequency range of interest without seriously affecting the differential mode. Sometimes this is not enough and in some cases engineers try to use two common mode chokes in series to improve the performance. FIG. 3 shows prior art common mode attenuation using a common mode choke, the operation of which can be described with reference to the following equations:

$$V1 = L1 \cdot \frac{dI1}{dt} + M \cdot \frac{dI2}{dt}$$

$$V2 = M \cdot \frac{dI1}{dt} + L2 \cdot \frac{dI2}{dt}$$

where for L=L1=L2

$$M = k \cdot \sqrt{L1 \cdot L2} = k \cdot L$$

We get:

$$V1 = (1 \pm k) \cdot L \cdot \frac{dI1}{dt}$$

$$V2 = (1 \pm k) \cdot L \cdot \frac{dI2}{dt}$$

For differential signals I1=−I2, k is negative. For extremely tight coupling k~1, therefore there is virtually no voltage drop over the common mode choke for a differential signal, but for a common mode signal and tight coupling the voltage drop is proportional to (1+k)=~2. This means that the common mode is attenuated. If the coupling is not very tight, then not only is the common mode attenuation not as high, but the differential mode is attenuated. For high-speed data communication, with data rates in the range of 10 GHz, the common mode chokes are typically made of bifilar windings wound around the ferrite bead. For this type of common mode choke, the coupling factor is in the range of 0.7 to 0.9, which leads to substantial attenuation of differential mode signals. This also means that it is preferable to use the tight magnetic coupling, which requires a fairly large area if implemented on chip or package. It is also challenging to achieve magnetic coupling factors of even 0.8. The ferrite based chokes need to be mounted on the top of the PCB and this requires PCB vias that can be detrimental to performance at high frequencies. If the differential lines are on top of the PCB than they can radiate. Also, the mounting pads for the common mode chokes will present discontinuity.

Having magnetic coupling of approximately 0.8 can also limit the value of the self inductances of high speed data common mode chokes, otherwise the attenuation of the differential mode will be too high. Therefore, as the values of self-inductances of common mode chokes generally need to be small, the common mode attenuation, which is proportional to the self-inductance, is also not large enough. Also, the common mode chokes do attenuate common mode proportional to frequency, so higher the frequency the higher the attenuation of the common mode. The spectrum of the common mode contains the discrete components and it is advantageous if we can build a structure that can attack and filter specific frequencies.

Therefore, it is desirable to have a structure that can perform common mode filtering well without undue attenuation of the differential signal, and preferably that does not require tight or high magnetic coupling for its operation.

SUMMARY OF THE INVENTION

It is an object of the present invention to obviate or mitigate at least one disadvantage of previous common mode filters.

In a first aspect, there is provided a common mode filter for high speed data communications over differential signal lines. The common mode filter comprises signal splitting means, phase shifting means, and signal combining means. The signal splitting means split signals transmitted from a first port connected to a first line of a pair of differential signal lines and a second port connected to a second line of the pair of differential signal lines. The phase shifting means, which are in communication with the signal splitting means, invert one of each of the split signals. The signal combining means, which are in communication with the signal splitting means and the phase shifting means, combine the inverted signals from each of the first and second ports with the split signals from the other of the first and second ports, thereby attenuating common mode signals carried on the pair of differential signal lines, and transmit the resultant combined signals to third and fourth ports.

According to embodiments, the signal splitting means and the signal combining means can be implemented as single functional blocks. For example, the single functional blocks can be junctions between a slot-line shorted at both ends and the pair of differential signal lines; or junctions between a plurality of slot-lines, shorted at both ends, and the pair of differential signal lines, and wherein each shorted slot-line provides phase-shifting at a different common mode discrete frequency.

In the slot-line embodiment, the slot-line can be formed in a ground plane, and the pair of differential signal lines can strip-lines or microstrip lines. The shorted ends of the slot-line provide the phase shifting means, and appear as an effective slot-line open to common mode signals. The shorted ends of the slot-line can, for example, a length equal to one quarter wavelength of a common mode discrete frequency, and can be in the form of, for example, quarter wavelength stubs, circular stubs, radial stubs or diamond stubs.

According to further embodiments, the phase shifting means can be balanced-to-unbalanced (BALUN) transformers connected to a differential signal driver, or at least one of the signal splitting means, the phase shifting means and the signal combining means is implemented in a digital signal processor.

According to a further aspect, there is provided a high speed communication system using differential transmission lines. The system comprises a differential input driver providing signals for transmission over the differential transmission lines, and a common mode filter. The common mode filter is comprises of a signal splitter to split signals transmitted from a first port connected to a first line of a pair of differential signal lines and a second port connected to a second line of the pair of differential signal lines; a phase shifter communicating with the signal splitter to invert one of each of the split signals; and a signal combiner communicating with the signal splitter and the phase shifter to combine the inverted signals from each of the first and second ports with the split signals from the other of the first and second ports, thereby attenuating common mode signals carried on the pair of differential signal lines, and to transmit the resultant combined signals to third and fourth ports.

According to yet another aspect, there is provided a method of filtering common mode signals in high-speed data communications over differential signal lines. The method comprises splitting signals transmitted from a first port connected to a first line of a pair of differential signal lines and a second port connected to a second line of the pair of differential signal lines; inverting one of each of the split signals; combining the inverted signals from each of the first and second ports with the split signals from the other of the first and second ports, thereby attenuating common mode signals carried on the pair of differential signal lines, and transmitting the resultant combined signals to third and fourth ports.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention provides a structure that can be used to make a common mode filter. Only the common mode is significantly attenuated and the differential mode is not attenuated. This structure can be implemented in a number of ways, a specific embodiment using strip-line, or microstrip line, and slot-line junctions is very compact and well suited to be used with multilayer PCB and does not require any extra components. It can be designed to attenuate certain discrete frequencies, by designing the poles of the transfer function to be at these frequencies. This is an improvement over the common mode choke filters as the spectrum of common mode noise has the highest level spurs at discrete frequencies that are harmonically related to the symbol rate. Embodiments of the present invention result in good return loss of differential signals. Embodiments of the present invention use a strip-line line and slot-line junctions arranged in such a fashion to suppress the common mode propagating along the two strip-lines or microstrip lines while at the same time not affecting the differential mode propagation. According to embodiments of the present invention, the strip-line line and slot-line form a junction, not a transition, thus forming a four port element.

Figure 1:
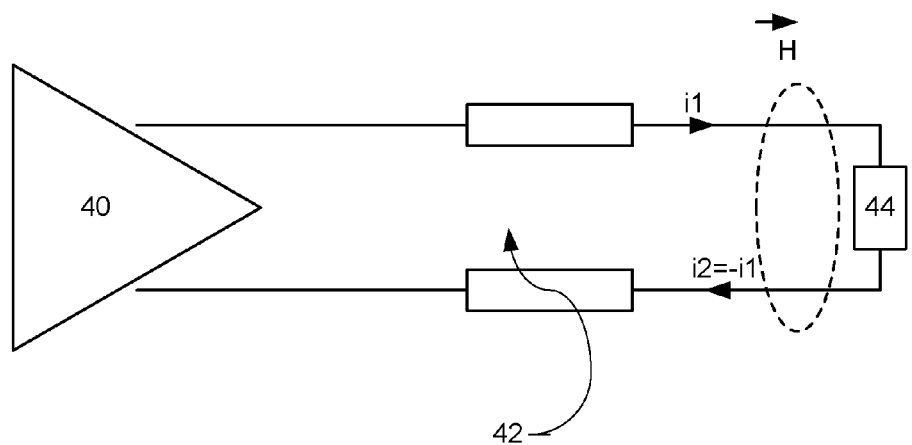
FIG. 1 illustrates transmission lines that carry only differential signals should not radiate much.
Figure 2:
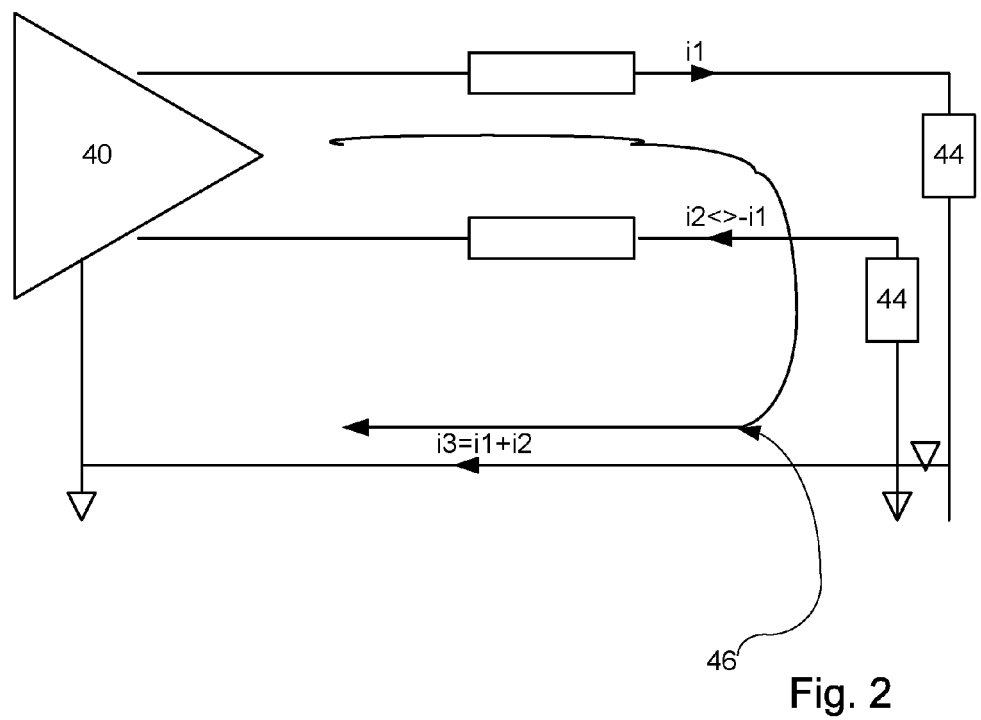
FIG. 2 illustrates a common mode current loop closed through the ground.
Figure 3:
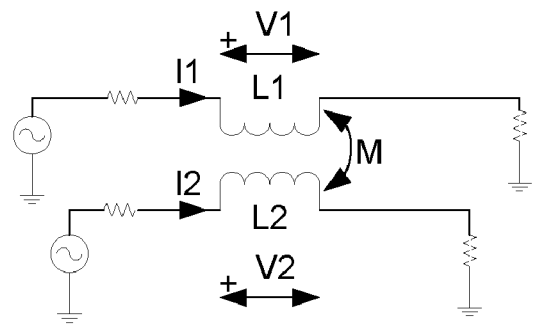
FIG. 3 illustrates a prior art common mode choke.
Figure 4:
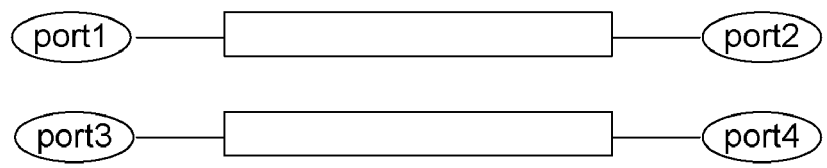
FIG. 4 illustrates port assignment of pair of coupled transmission lines.

The basis for, and idea behind, embodiments of the present invention can be described using S-parameters and power flow graphs. A differential signal is sent using coupled transmission lines. Ports can be assigned to this structure as shown in FIG. 4. S-parameters can then be used to calculate the transfer function of the pair of coupled transmission lines. Both differential and common mode transfer functions can be calculated.

Figure 5:
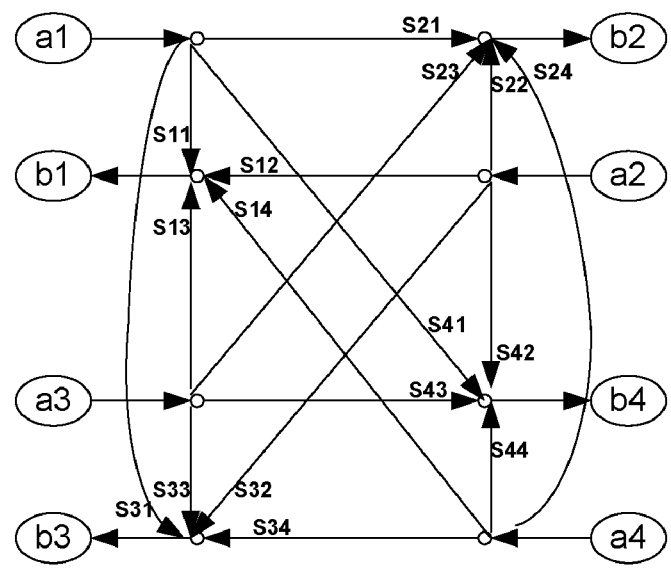
FIG. 5 illustrates a power flow graph of pair of coupled transmission lines.

FIG. 5 shows a power flow graph of the pair of coupled transmission lines shown in FIG. 4. The power flow can be drawn by inspection, and the expressions for both transfer functions can be derived. In case of differential mode, a differential signal is applied to port 1 and port 3, which means that the voltages on these two ports are equal and opposite in sign. In the case of common mode, both ports 1 and 3 are excited with identical signal. This results in the following common and differential transfer functions:

$$S21\text{differ} = \frac{1}{2} \cdot (S21 + S43 - S41 - S23) \quad (1)$$

$$S21\text{comm} = \frac{1}{2} \cdot (S21 + S43 + S41 + S23) \quad (2)$$

where S21differ is the transfer function of the differential mode between port 1 and port 2 and S21comm is the transfer function of the common mode.

From equation (2) it is clear that S21comm can be reduced, thus attenuating the common mode. The signal from port 1 can be split into two equal signals and one of these two signals inverted, and the same done with the signal from port 3. Thus, S21=−S41 and S43=−S23, S21comm=0. At the same time S21differ is maximized, under the assumption that the transmission lines are symmetrical (S21=S43).

Figure 6:
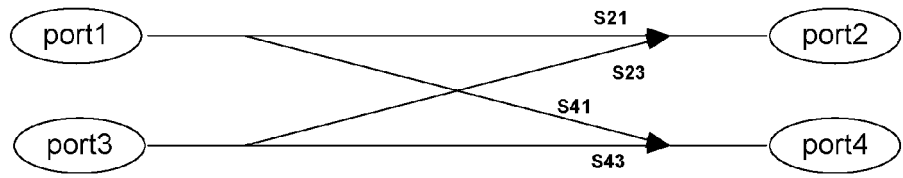
FIG. 6 illustrates splitting and combining signals in transmission lines.

This conclusion about how the common mode can be attenuated without attenuating differential mode can be described more simply with reference to FIG. 6, without S-parameters and flow graphs. Basically, for common mode the voltages on ports 1 and 3 are identical. If ports 1 and 3 are connected though a circuit that produces a 180 degree phase shift at a certain frequency, then the common mode components from ports 1 and 3 will be opposite in sign and the same in amplitude and will disappear. Power from port one can be split equally and one half can be transmitted to port 2 and other half can be transmitted to port 4. The same operation can be done to port 3 signal. The main difficulty is to wide band invert some portions of the signal. As noted above, common mode chokes require tight magnetic coupling. However, if the signals at ports 1 and 3 are split equally, and later combined at ports 2 and 4, then there is no need to have tight coupling, and signal dividers and combiners can be used.

It follows that simple analog (or digital) signal processing can be used to filter the common mode signal. A block diagram of an embodiment illustrating this is shown on FIG. 7. Two signal splitters 60 and 62 split the signals Vpos+Vcm and Vneg+Vcm from ports 1 and 3, respectively, where Vpos and Vneg are differential signals and Vcm is a common mode signal. Each of the split signals are phase shifted by circuits 64 and 66 that introduce phase shifts of α and α-π, respectively. The shifted signals from ports 1 and 3 are then combined by circuits 68 and 70 and transmitted to ports 2 and 4, resulting in output signals A=+0.5·Vpos·$e^{i\alpha}$·0.5·Vneg·$e^{i\alpha}$ and B=−0.5·Vpos·$e^{i\alpha}$+0.5·Vneg·$e^{i\alpha}$ at ports 2 and 4, respectively.

Figure 7:
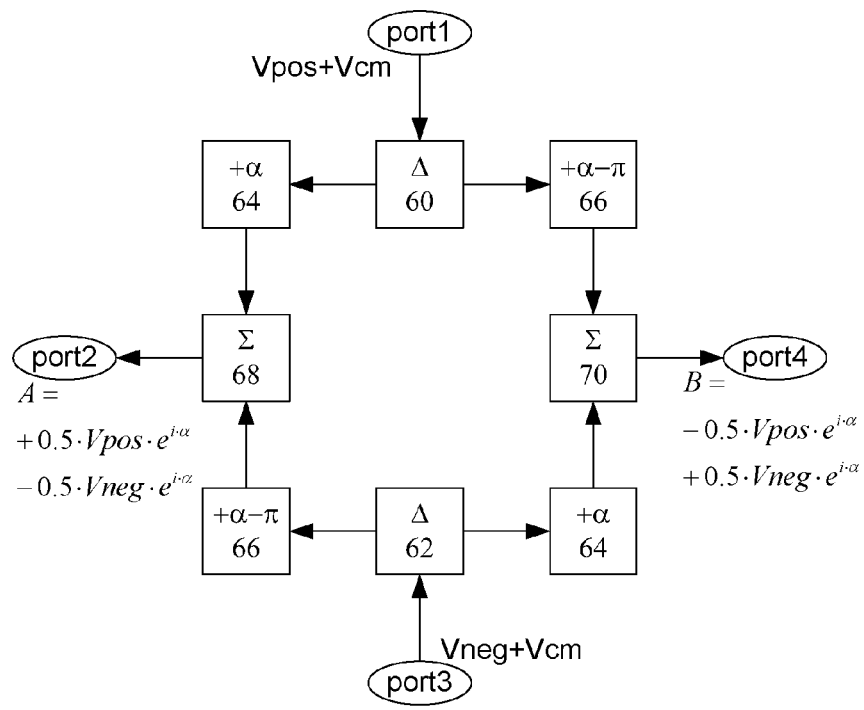
FIG. 7 illustrates a general block diagram of the common mode filter according to an embodiment of the present invention.

The block diagram of FIG. 7 is general in a sense that phase shift circuit 64 can have any phase shift α as long as phase shift circuit 66 produces a phase shift π-α. As is apparent, the structure is symmetrical. In order not to distort the digital signals, all the blocks are linear phase elements. The width of the linear phase is dependent on the power spectral density of the digital signal. It is preferable to design the blocks such that the linear phase is within 5/2*symbol_rate.

Figure 8:
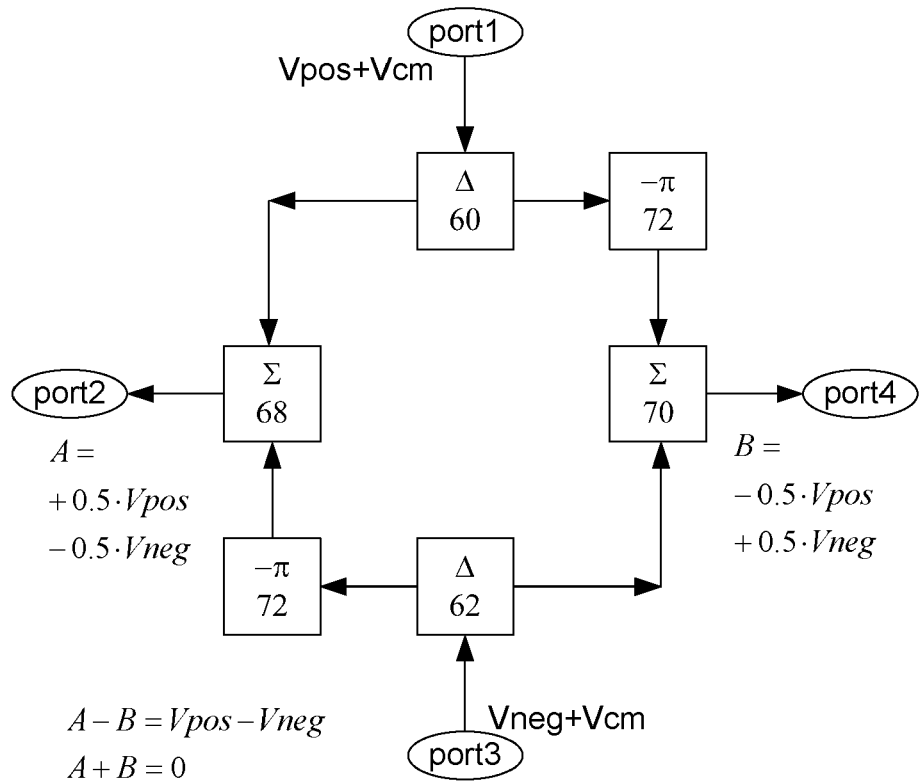
FIG. 8 illustrates a simplified block diagram of the common mode filter according to an embodiment of the present invention.

To simplify the discussion, we can set α=0, as this is only a static phase shift, and it will not influence the generality of the discussion. The resulting circuit is shown in FIG. 8, and shows how the structure can be implemented in a more compact manner. Two signal splitters 60 and 62 again split the signals Vpos+Vcm and Vneg+Vcm from ports 1 and 3, respectively. One of the split signals from each splitter 60, 62 is phase shifted by circuits 72 that introduce a phase shifts −π. The shifted signals from ports 1 and 3 are then combined with the unshifted signals by signal combiners 68 and 70 and transmitted to ports 2 and 4, resulting in output signals A=+0.5·Vpos−0.5·Vneg and B=−0.5·Vpos+0.5·Vneg at ports 2 and 4, respectively. Thus, A−B=Vpos−Vneg and A+B=0; the differential mode is not attenuated whereas the common mode is equal to 0.

Each of the components of FIG. 8 can be implemented separately to achieve common mode filtering. For example, it can be implemented using analog blocks, with each circuit performing one operation of the block. It is possible to build wideband signal splitters and combiners, and there are a number of signal splitters and combiners using floating grounds that can have a very wide frequency range. For example, a Wilkinson divider/combiner in strip-line or microstrip can be made with a very wide operation band, as can Lange couplers. Similarly, a 180 degree phase shifter can be implemented using BALUN (BALanced-to-UNbalanced) transformers, or other known means. It is also possible to implement the filter of FIG. 8 using mathematical processing, such as Digital Signal Processing (DSP) the common mode after the two signals are sampled by a high sample rate analog-to-digital converter (ADC). It is fully within the contemplation of the present invention that ADCs will operate at Giga-sample rates in the near future.

While the generalized block diagrams in FIG. 7 and FIG. 8 can be implemented in a number of ways implementing each block separately, as described above, an exemplary embodiment will now be described, which is well suited for a multilayer printed circuit board (PCB) or package substrate or on-die implementation and requires no additional components. With digital rates increasing, it is increasingly possible to implement structures on the chip die or package substrate of a chip.

Figure 9:
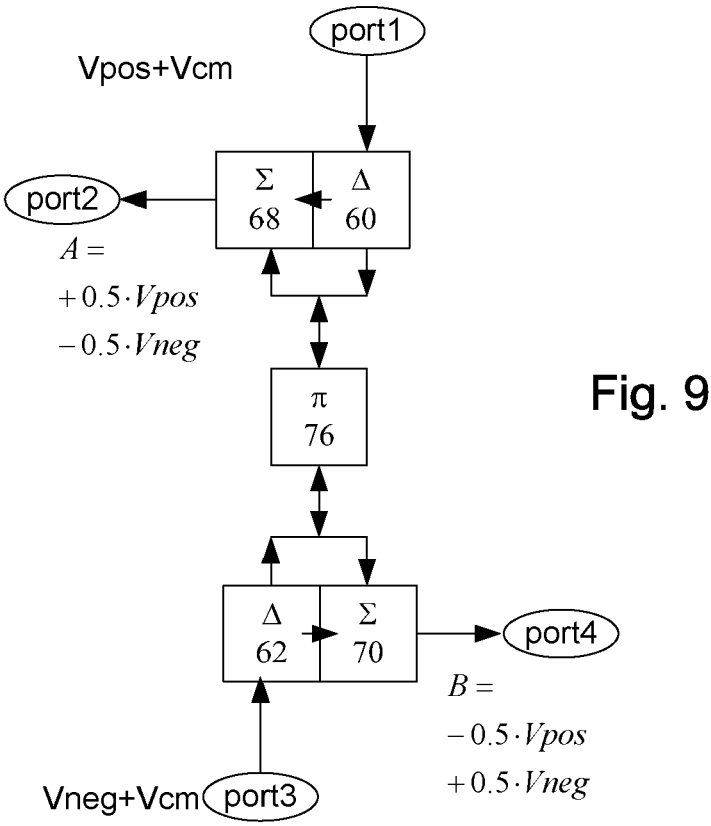
FIG. 9 illustrates a first stage of a general block diagram of common mode filter reduction.

By examination, the signal splitter 60 and combiner 68 in FIG. 8 can be merged into one block, as can the signal splitter 62 and combiner 70. Also, the principle of superposition can be used to combine phase shifters 72 into a single block, because both blocks perform the same function. In FIG. 9 a simplified generalized block diagram of a common mode filter according to an embodiment of the present invention is shown with only one phase shifter 76 that introduces a phase shift π.

Figure 10:
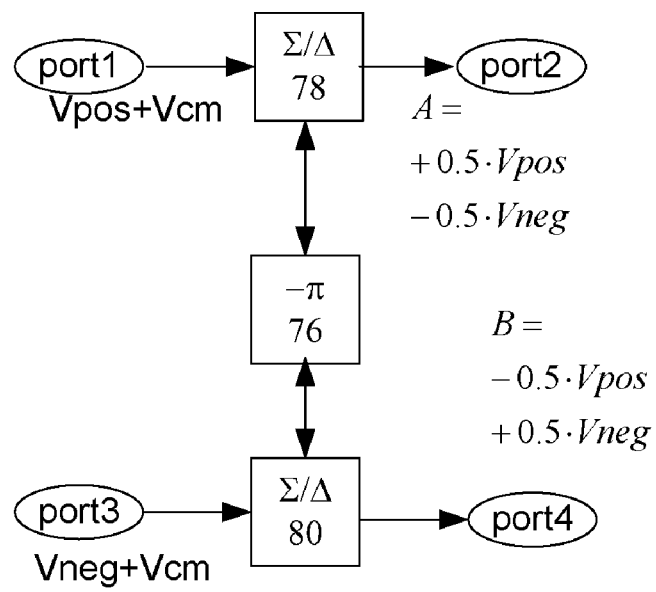
FIG. 10 illustrates a second stage of a general block diagram of common mode filter reduction.

Combiners and splitters can be implemented as a single circuit, with different inputs. So, due to the principle of superposition, a maximally reduced block diagram can be used. FIG. 10 illustrates a further reduced block diagram of a common mode filter according to an embodiment of the present invention. The common mode filter comprises two signal splitter/combiners 78 and 80 and a phase shifting circuit 76 that introduces a phase shift 7E.

A broadband inverter, or 180 degree phase shifter, using a microstrip to slot-line transition is well known. Another known use of microstrip to slot-line transitions is as an antenna feed. The operation of a prior art 180 degree phase shifter formed of a microstrip to slot-line transition will be described with reference to FIG. 11, which shows a top view of two back-to-back microstrip to slot-line transitions. Two microstrip lines 90 are coupled by a slot-line 92 in the ground plane. The ends of each microstrip are shorted to the ground plane by the vias 94. Circle openings 96 in the ground plane at either end of the slot-line provide open circuits at both ends of the slot-line 92

Figure 11:
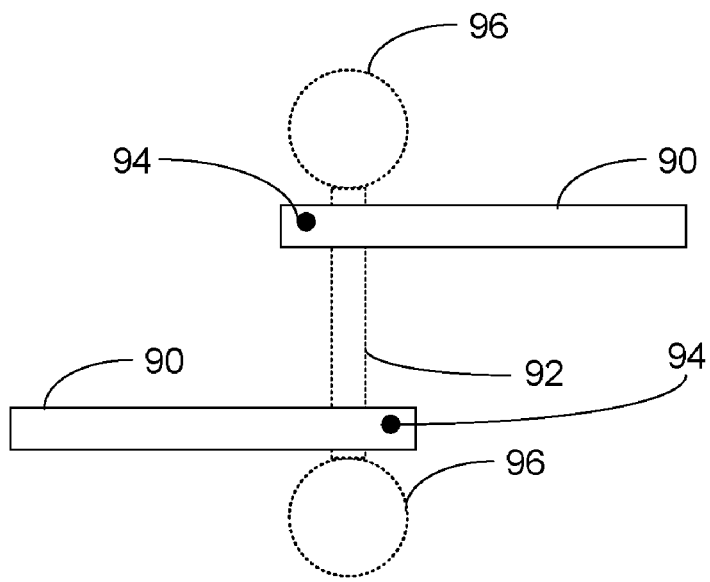
FIG. 11 illustrates a top view of a prior art 180 degree phase shifter using two microstrip to slot-line transitions.

The circuit in FIG. 11 is a wide-band 180 degree phase shifter. It will couple the signal from one of the microstrip lines to the other with a 180 degree phase shift. This property of 180 degree phase shifting is used in an embodiment of the common mode filter of the present invention. Note that the inverter of FIG. 11 shorts the microstrip at the ends of both microstrip lines 90. In the present invention, the strip-line (microstrip line) is continued and not shorted at the transition. This substantially changes the operation of the element and changes it from transition to junction.

Figure 12:
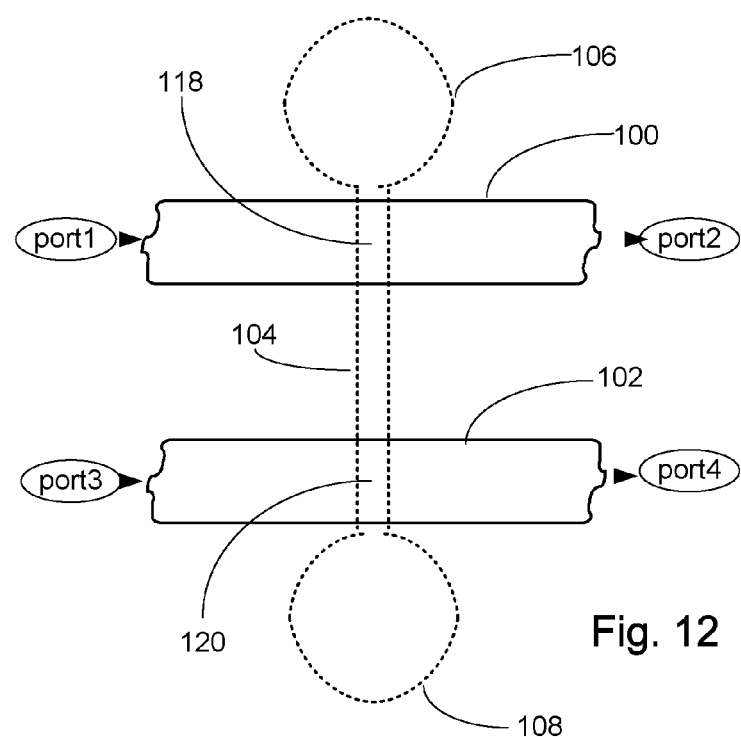
FIG. 12 illustrates a top view of back-to-back two strip-line line and slot-line junctions.

The structure in FIG. 10 lends itself easily to a compact embodiment using two back-to-back strip-line and slot-line junctions. FIG. 12 shows a top view of a common mode filter, according to an embodiment of the present invention, using two back-to-back strip-line and slot-line junctions. A first strip-line 100 and second strip-line 102 are connected by a slot-line 104. Each end of the slot-line 104 is terminated by a broadband slot short 106, 108. A strip-line implementation is presently preferred as it is shielded and it will not radiate, but the implementation can be alternately achieved with microstrip lines instead.

Figure 13:
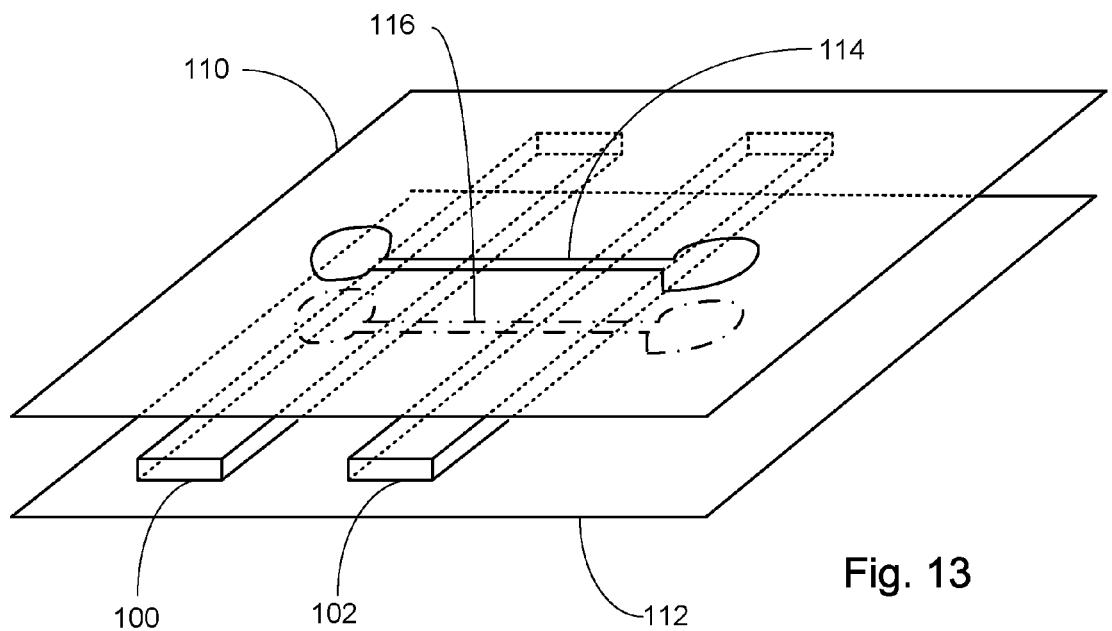
FIG. 13 illustrates a tri-dimensional representation of a presently preferred embodiment.

A three-dimensional view of the structure of FIG. 12 is given in FIG. 13. The first strip-line 100 and second strip-line 102 are sandwiched between a top ground plan 110 and bottom ground plane. A dielectric (not shown) fills the gap between the ground planes 110 and 112. Top and bottom ground plane slots 114 and 116, with shorts at both ends, are formed in the top and bottom ground planes 110 and 112, respectively.

The slot-line does radiate a small amount, but the fields rapidly decay away from the slot. A narrower slot has faster decay of the fields away from slot than a wide slot. The circuit of FIG. 12 can be designed to block the common mode frequencies propagating along the high speed differential lines and the minimal radiation from the slot-lines and slot-line shorted lines/elements can be attenuated using additional grounds as shields.

Additional shielding is not necessary when the slot-line open is implemented with a quarter-wave shorted slot-line. The slot-line fields are concentrated near the slot and testing shows that no additional shielding is required. If quarter-wave shorted slot-line structures are not used to create the slot-open at the junction, additional shields and strategically placed slits in these shields can be used to prevent induced Eddy currents in the shields. Such shielding creates magnetic fields that will oppose the magnetic fields from the structures that are used to form the effective slot-open at the junctions. The presence of grounded shields reduces the effective inductance of the slot-short structures and shifts the poles of the common mode transfer function towards higher frequencies, but this can be taken into account during the design.

Figure 14A:
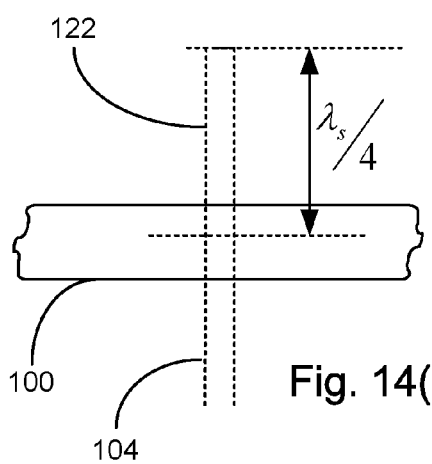
FIG. 14 illustrates various implementations of effective slot-line open.
Figure 14B:
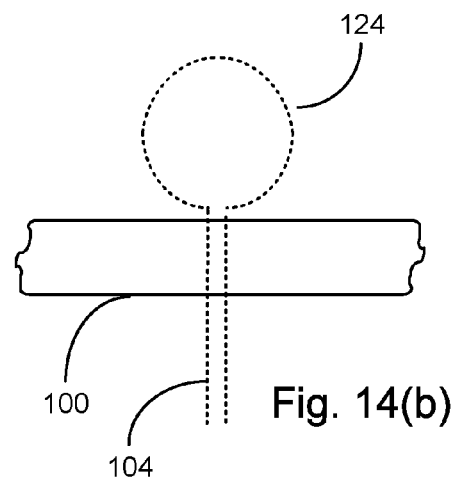
Figure 14C:
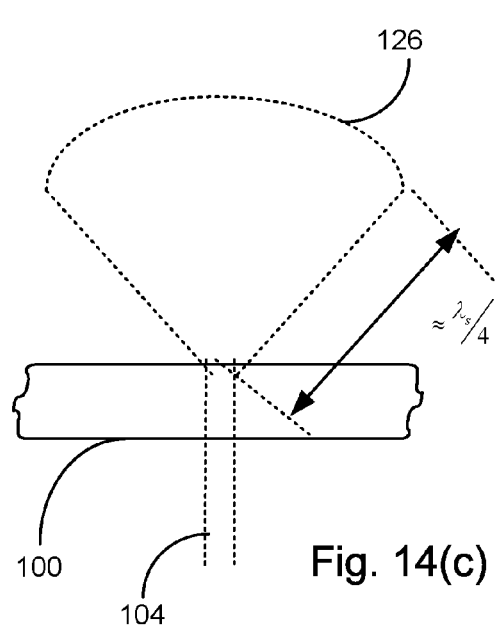
Figure 14D:
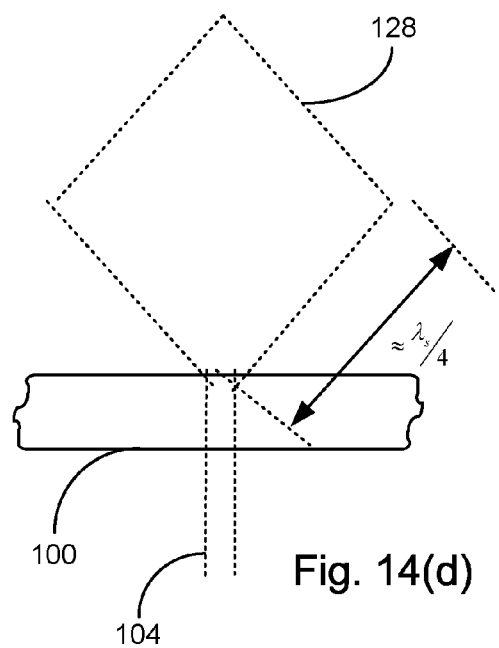

The effective slot-line open is formed at both ends of the slot-line between the openings 106, 108 and the two junctions 118 and 120. The effective slot-line open can be implemented in number of ways. The basic idea is to short a slot-line and then have a quarter of wavelength that will transform the short into an open at the strip-line to slot-line junction. The effective slot-open at the junction, channels the energy down the slot-line towards the other junction. The bandwidth of the slot-line open and how the slot-line short is transformed to an open at the end of the element affects the effective bandwidth of the common mode filter. For those skilled in microwave design, it is easy to understand the difference between a slot-line open using a quarter-wavelength slot-line shorted at the end, and a shorted radial stub. Four different embodiments for creating an effective slot-line open using a slot-line short and quarter-wavelength transformer are shown on FIGS. 14(a)-(d). The four embodiments are a quarter wave slot-line shorted at the end 122 (FIG. 14(a)); circular stub 124 (FIG. 14(b)); radial stub 126 (FIG. 14(c)); and diamond stub 128 (FIG. 14(d)).

The effectiveness of broadband slot-line open affects the bandwidth of the common mode attenuation. The best performance of the slot-open structure is at the frequency of the quarter-wave of the slot-open structure. As the common mode spectrum is concentrated at discrete frequency components related to symbol rate, it is easy to repeat the structure several times to specifically target the symbol rate frequencies.

Figure 15:
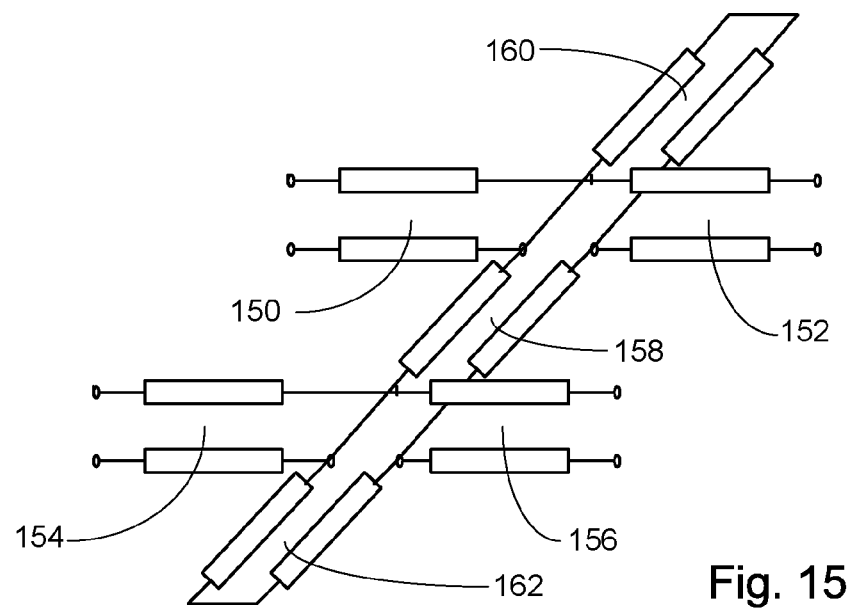
FIG. 15 illustrates an equivalent filter model.

To explain the operation of the strip-line/slot-line common mode filter, FIG. 15 shows a simplified equivalent model of the common mode filter according to an embodiment of the present invention that uses two strip-line, or microstrip, line junctions with a slot-line. Strip-line segments 150, 152, 154, and 156 each have a characteristic impedance Zom. The slot-line 158 has a characteristic impedance Zs. And, the effective slot-line opens are shown at 160 and 162.

In this embodiment, the shorted slot-line elements 160, 162 and slot-line 158 are in parallel. The shorted slot-line/slot-line combination is in series with the strip-line at both junctions. Without shorted slot-line structures at both junctions, the slot-line between junctions would be shorted at its ends and the voltages necessary to excite the slot-line would not be developed. An alternative view of the slot-line and shorted slot-line element is that it acts as a frequency dependant inductance that enables the formation of a voltage across the slot. For low frequencies, this inductance is approximately zero and there is no voltage created across the slot. For frequencies for which the slot-open is quarter-wave, the inductance of the slot-open line is at a maximum, so the largest voltage drop is created across the slot.

This understanding of slot-line shorted structures being frequency dependant inductances explains why the differential mode is not attenuated and the common mode is attenuated. The inductance of the slot causes the voltage across the slot to occur. For a differential mode signal, the voltage from a positive source created across the slot will be equal to one created by a negative voltage source, but opposite in polarity. Thus, the total voltage across the slot created by differential sources is equal to zero and there will be no attenuation caused by the slot structure; the differential signal will traverse this structure as if it does not exist. For a common mode signal, the voltages created across the slot will be identical and will add up. Most of the common mode voltage will drop across the slot, and very little voltage will be left to excite the rest of the line towards the load. Since the differential lines cross the domains of different grounds in embodiments of the present invention, the slots and slot-lines are shorted at their ends and contain the signal within their boundaries.

To analyze the operation of the strip-line/slot-line common mode filter, the manner in which the shorted slot-line that forms the effective slot-line open affects the circuit is first considered. The equivalent circuit can then be simplified to find the optimum arrangement of impedances of strip-lines and slot-line.

We can see that at low frequencies the slot-line open, created using the slot-line-short and quarter-wave line, does not present any hurdle for the signal. The return current will flow around the slot-open. At low frequencies the impedance of the additional path around the slot-line open is small, so there is almost no voltage across the slot. Therefore, the voltage at either end of the slot between the strip-line and ground is not altered. At low frequencies the strip-line signal is not altered at all. At higher frequencies, the slot-line open can be approximated with a series shorted line with impedance:

$$Zso = j \cdot Zssc \cdot \tan(\beta \cdot l)$$

Zso is the series impedance in the ground section of the slot-line; Zssc is the characteristic impedance of the slot-line short, β is the phase-change coefficient per meter; l is length in meters; and $$\beta = \frac{2 \cdot \pi}{\lambda}.$$

Therefore, for lengths of the line equal to a quarter wavelength, the slot-line short presents a large impedance and the maximum voltage is developed across the slot. Therefore, at these frequencies the most coupling between the two strip-lines and the most attenuation of the common mode will occur.

Figure 16:
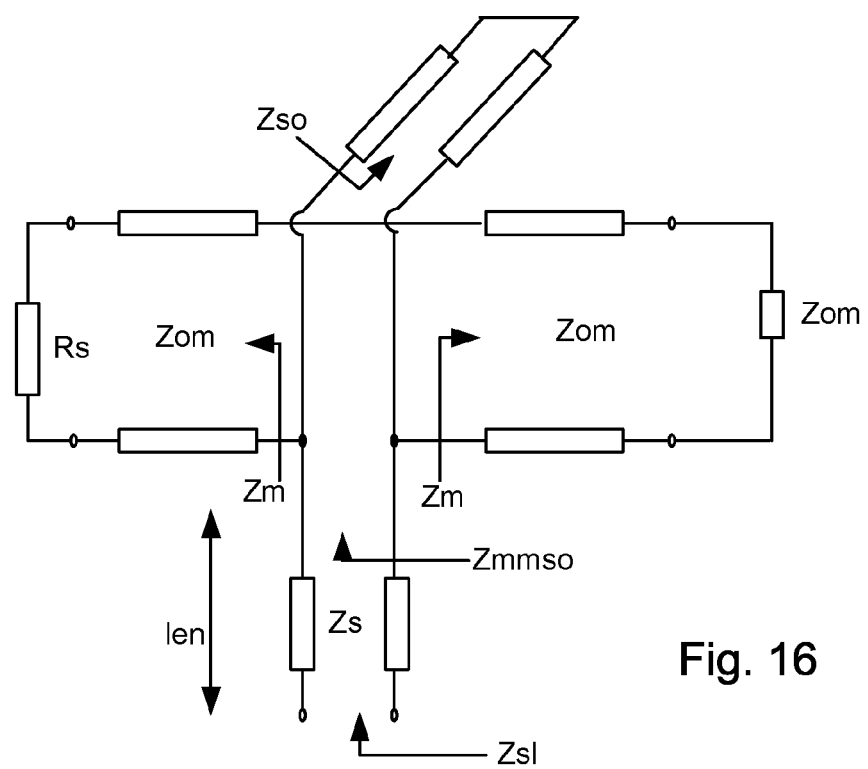
FIG. 16 illustrates impedances of one strip-line line and slot-line junction

FIG. 16 is an equivalent circuit showing the impedances of one strip-line line and slot-line junction. In FIG. 16 a top portion of the equivalent circuit of FIG. 15 is shown with only one strip-line line and slot-line junction. The strip-line characteristic impedance is Zom, and both sides are terminated in resistances that are equal in value to Zom (Rs=Zom and R1=Zom), so that there are no reflections from either side of the strip-line line. Under this condition the impedances Zm are equal to Zom.

Looking from the port of the slot-line, both sides of the strip-line line are in series, and the strip-line line is in parallel with the effective slot-line open. The effective impedance at the slot port is Zso.

$$Zmmso = \frac{2 \cdot Zom \cdot Zso}{2 \cdot Zom + Zso} \approx 2 \cdot Zom \text{ if } Zso \to \infty$$

$$Zsl = Zs \cdot \frac{Zmmso + j \cdot Zs \cdot \tan(\beta \cdot len)}{Zs + j \cdot Zmmso \cdot \tan(\beta \cdot len)} \approx 2 \cdot Zom \text{ if } Zso \to \infty$$

Since the junction is symmetrical, the voltage across the slot-line is then split equally between the strip-line on one side of the slot-line and the strip-line on the other side of the slot-line. It is also apparent that the two sides of the strip-line, one extending towards the source and the other extending towards the load, are in fact in series to each other and in parallel to the slot-line open. For frequencies for which the slot-line short structure transforms itself to high impedance, the slot-line is effectively terminated with an impedance equal to two times the strip-line characteristic impedance 2*Zom. This assumes that both sides of the strip-line are terminated with resistances equal to their characteristic impedance. Therefore, in order to prevent reflections from the second transition back to first transition, it is preferable to make the slot-line characteristic impedance Zsl equal to two times Zom. For frequencies for which the slot-line short structure does not transform itself to high impedance, there should be no problems with reflections, as at these frequencies there is not much power inserted into the slot-line.

Figure 17:
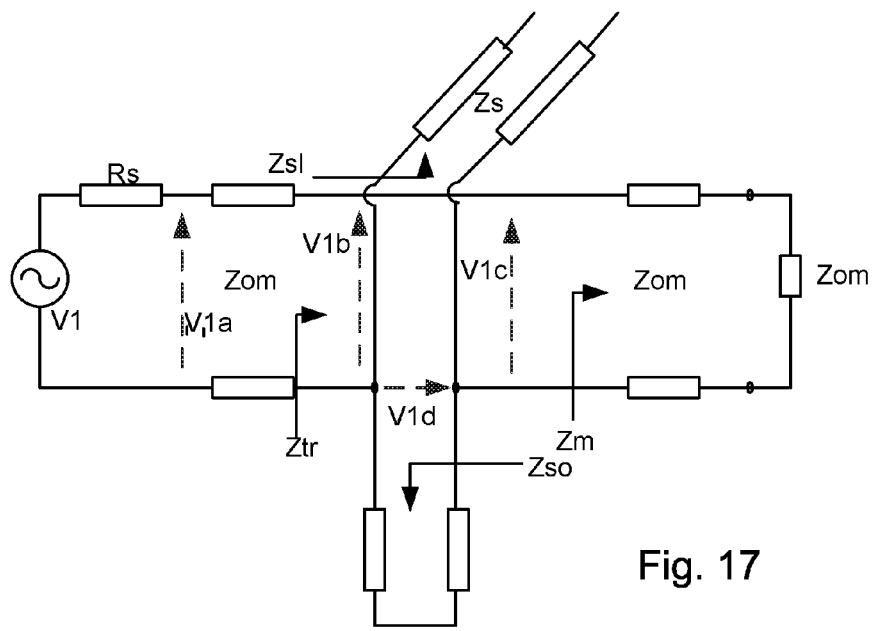
FIG. 17 illustrates equivalent model of one strip-line line to slot-line junction.

FIG. 17 is an equivalent model of one strip-line to slot-line junction, and can be described by the following equations:

$$Ztr = Zm + Zso\|Zsl = Zm + \frac{Zso \cdot Zsl}{Zso + Zsl} \approx Zm + 2 \cdot Zm = 3 \cdot Zm \text{ if } Zso \to \infty$$

$$V1a^+ = \frac{Zom}{Zom + Rs} \cdot V1 = \frac{1}{2} \cdot V1 = V1b^+$$

$$V1b^- = \Gamma ssj \cdot V1b^+ =$$

-continued $$\frac{Ztr - Zom}{Ztr + Zom} \cdot V1b^+ \approx \frac{3 \cdot Zom - Zom}{3 \cdot Zom + Zom} \cdot V1b^+ = \frac{1}{2} \cdot V1b^+ \text{ if } Zso \to \infty$$

$$V1b = V1b^+ + V1b^- = \left(1 + \frac{Ztr - Zom}{Ztr + Zom}\right) \cdot V1b^+ \approx \frac{3}{2} \cdot V1b^+ \text{ if } Zso \to \infty$$

$$V1b = V1c + V1d$$

$$V1d^- = \frac{\frac{Zso \cdot Zsl}{Zso + Zsl}}{Zm + \frac{Zso \cdot Zsl}{Zso + Zsl}} \cdot V1b \approx \frac{2}{3} \cdot V1b = V1b^+ \text{ if } Zso \to \infty$$

$$V1c^- = \frac{Zm}{Zm + \frac{Zso \cdot Zsl}{Zso + Zsl}} \cdot V1b \approx \frac{1}{3} \cdot V1b \approx \frac{1}{2} \cdot V1b^+ = V1b^- \text{ if } Zso \to \infty$$

The voltage V1d across the slot-line is split in half at the strip-line line at the junction, as the junction is symmetrical in respect to the slot-line. This means that if the junction is designed such that Zs=2*Zom, there will be a voltage of magnitude abs (½*V1a) at the strip-lines.

Figure 18:
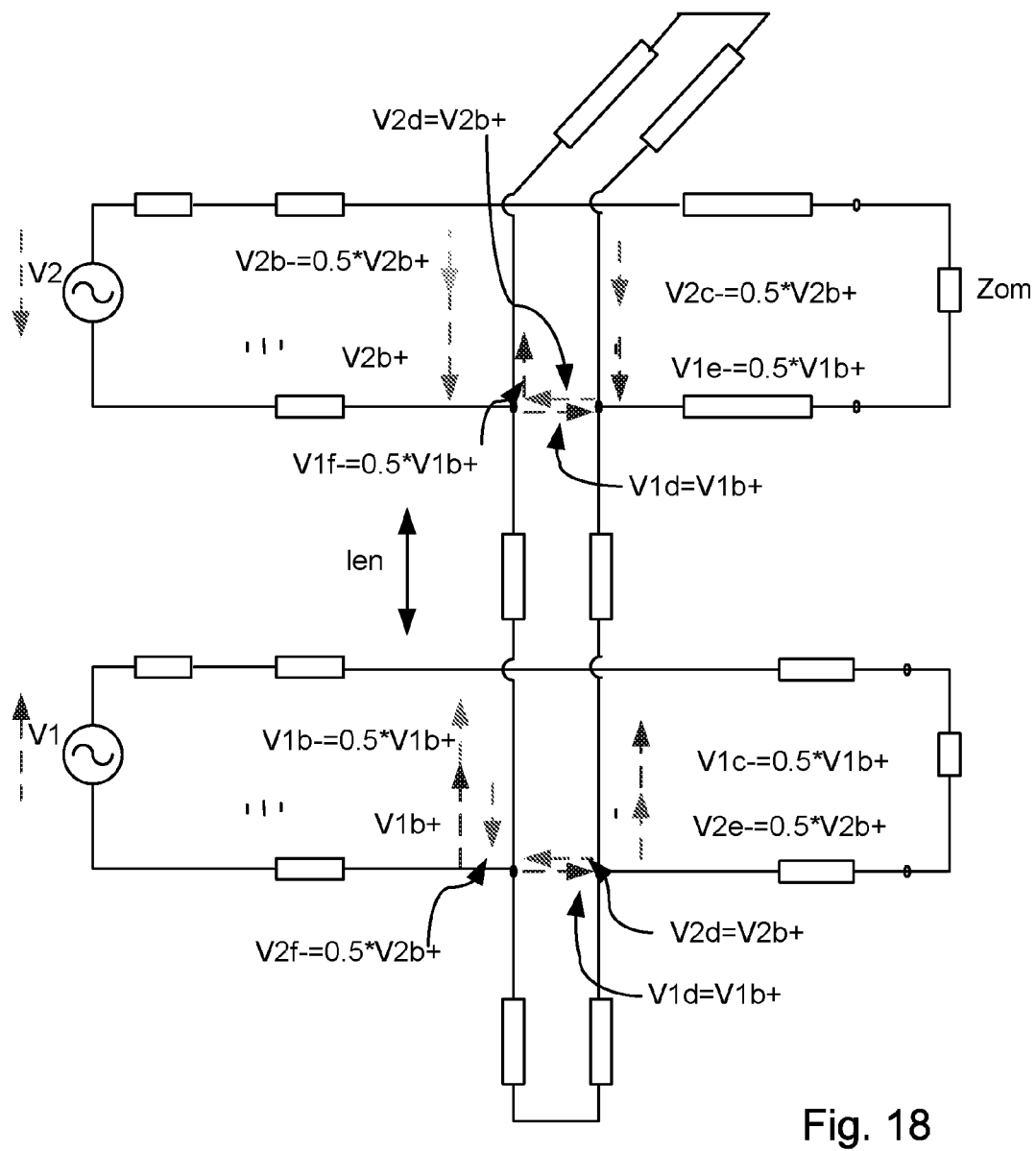
FIG. 18 illustrates voltages on two junctions if Zos is infinite, Zs=2*Zom and length is small.

FIG. 18 shows the voltages on two junctions if Zos is infinite, Zs=2*Zom and length len is small. In FIG. 18, the incident waves to the junctions are designated with + and the emerging/reflected waves from the junctions are designated with –. For example, towards the load of the lower strip-line, we have voltages V1c– and V2e–. These voltages add in phase so that their total magnitude is equal to V1b+. The voltage emerging from the junction and going toward the load is equal in magnitude to a direct wave from source V1, as it would have been if there was no junction. Thus, there is no loss for differential signals.

The reflected voltage from the first junction V1b– and voltage emerging from the same junction due to the second source V2f– are same in magnitude but opposite in sign so in effect there are no reflections from the structure and inherently good differential return loss. A similar argument holds for V2 being equal in sign to V1, but in this case no signal will pass through the load and all the signal is reflected back to source. This is, of course, for a delay through the slot-line that is negligible.

Figure 19:
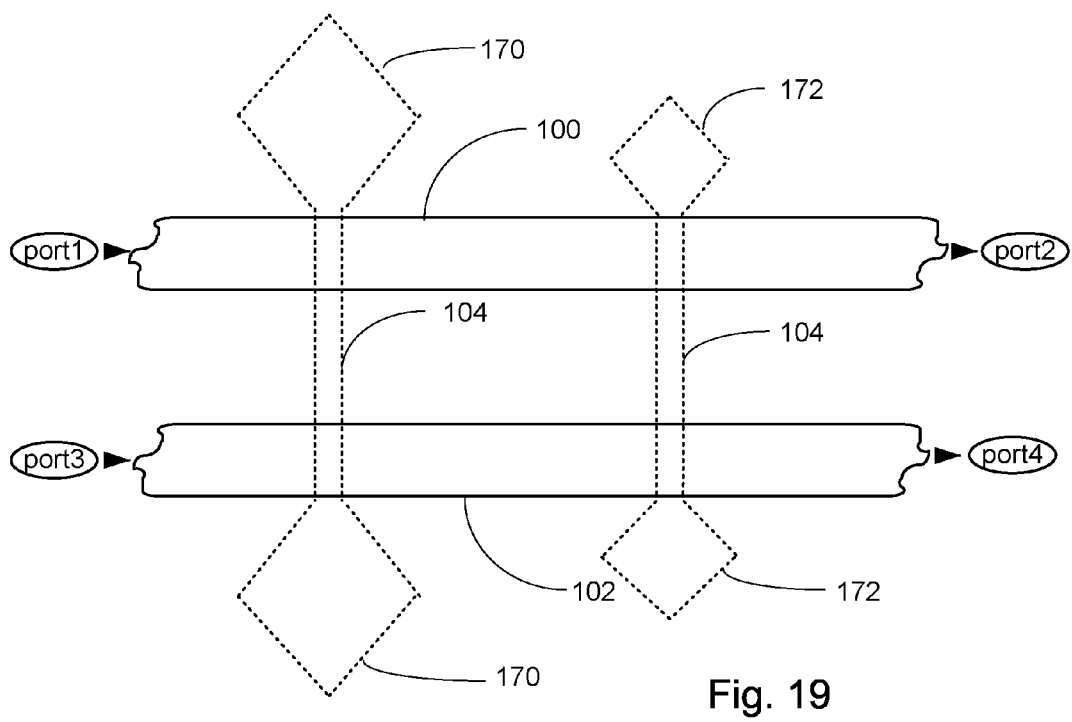
FIG. 19 illustrates a structure that can be repeated to target specific frequencies.

An embodiment with a repeated structure is shown in FIG. 19. In this case, the slot-line structure is repeated two times to target two different discrete frequencies that are related to the symbol rate. The choice of the frequencies at which the common mode will be attenuated most is selected by proper sizing of the slot short stubs 170 and 172. In this example, diamond stubs are used and the sides of the diamonds are chosen to be quarter wavelengths at those specific frequencies for which attenuation is desired.

Figure 20:
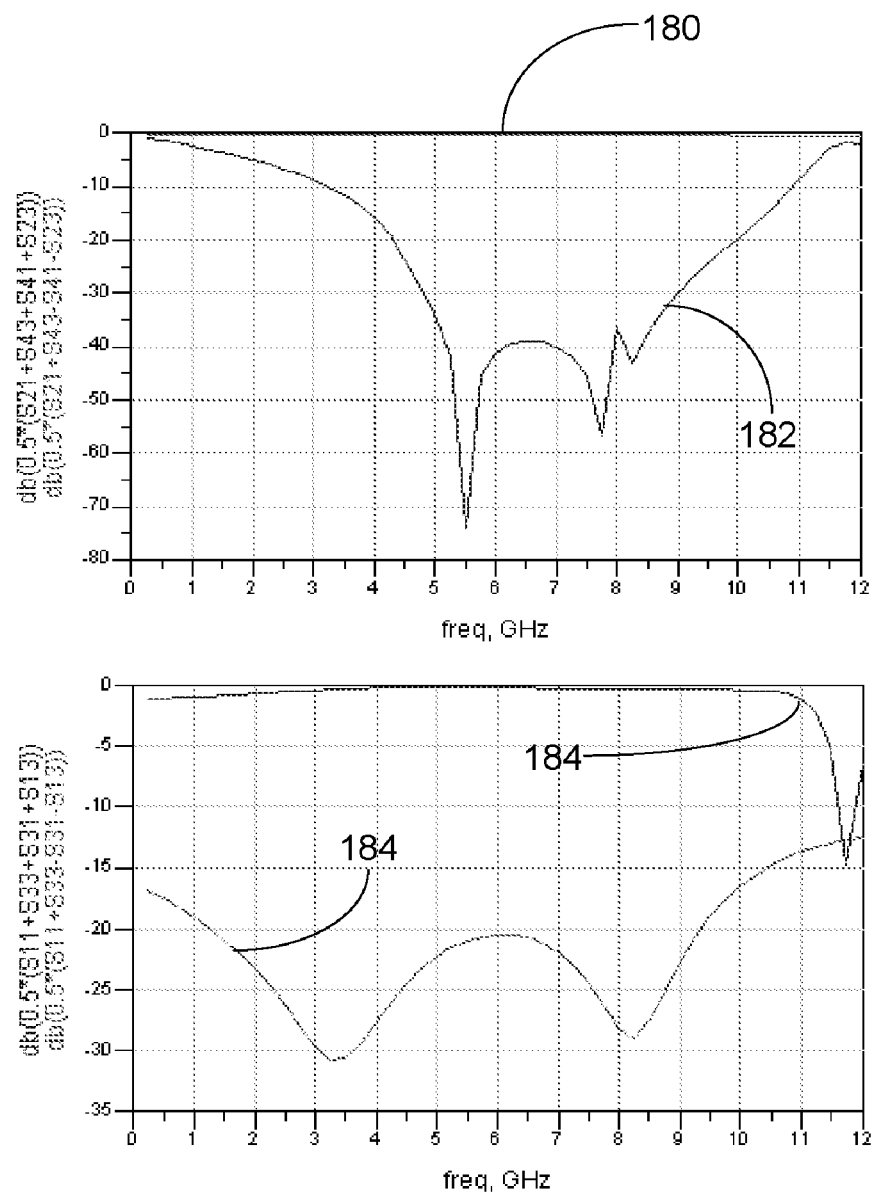
FIG. 20 illustrates performance of the repeated structure.

Performance of the structure from FIG. 19 is shown in FIG. 20. In FIG. 20, the top plot shows transfer functions of the differential mode 180 and common modes 182. The differential mode transfer function 180 shows almost no attenuation, whereas the common mode transfer function 182 shows attenuation of than 50 dB at specific frequencies. The bottom plot of FIG. 20 shows the return loss plots of the common mode 184 and differential mode 186. The differential mode 186 has a very good return loss around –20 dB, whereas the common mode 184 reflects the common mode almost completely as we expected.

Figure 21A:
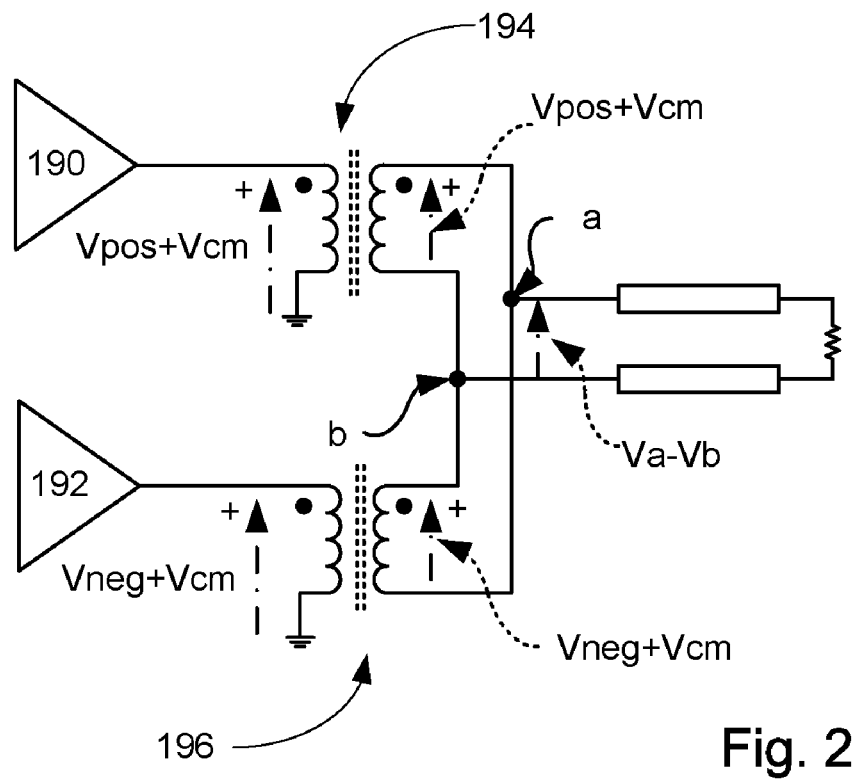
FIG. 21 illustrates use of the BALUN circuits to reduce the common mode noise.
Figure 21B:
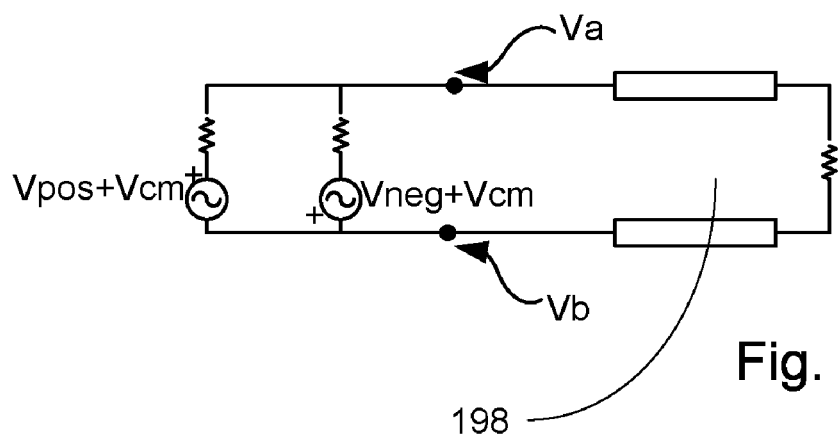

According to a further embodiment, BALUN circuits can also be used reduce the common mode. Starting from the block diagram for common mode filter, a power splitter and 180 degrees phase shifter can be implemented with BALUNs. The combining of the signals can be done by connecting ends of two balanced outputs. The two outputs will be in parallel, and, using Thevenen's theorem and the principle of superposition, it is easy to see that the common mode signal Vcm will not be present in the voltage Va-Vb. FIG. 21(*a*) shows an embodiment using a BALUN implementation. The BALUN circuit can be implemented with or without a center tap at the output. Block 190 is the positive signal portion of a differential output driver, and block 192 is the negative signal portion of differential output driver. Each BALUN 194 and 196 acts as a multipurpose circuit. It equally splits the signal from the driver side to two nodes designated as a and b. The arrangement of the two BALUN terminals is such that the phases of the input signals are inverted and are 180 degrees in respect to the two signals Vpos and Vneg emerging from the driver output. The line side windings of the BALUN transformers 194 and 196 arranged in such a manner that the two signals are added with 180 degrees phase shift. This means that the common mode portion will be zero and the total output will be Vpos−Vneg+Vcm−Vcm=Vpos−Vneg. FIG. 21(*b*) shows the simplified equivalent circuit of a common mode filter according to FIG. 21(*a*), where the differential transmission lines are shown at 198.

A drawback of the circuit of FIG. 21(*a*) is that there should be no coupling between the two BALUNs, so the two cannot be wound around the same core. The circuit from FIG. 21(*a*) blocks DC and low frequencies, and is not applicable to systems that use DC and low frequencies for sending data. It can be used if some kind of encoding is used, as in the case of DS1, DS2, DS3, E1, E2, E3 or similar data communication where the frequency components at low frequencies are suppressed. These systems use bipolar encoding so they are suited for transmission that needs to use transformers in order to isolate the IOs from the line. The two BALUN windings on the line side are in parallel, so if the line has a characteristic impedance Zc, each of the BALUN circuits on the line side need to appear as twice as large impedance.

Embodiments of the present invention are applicable to data communication where the data is sent differentially over transmission lines. In addition, embodiments of the present invention can be used for any electronic PCB or IC to reduce the common mode radiation from the transmission lines carrying the differential signals. Embodiments of the present invention can be implemented in chip or within the PCB and do not require any additional processing.

The common mode filter of the present invention can be easily implemented and can provide large attenuation of discrete frequencies of common mode. The preferred embodiment is cheaper that a common mode choke and it can target specific frequencies; thus delivering better performance than current art common mode filters implemented as common mode chokes.

In the above description, for purposes of explanation, numerous details have been set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A common mode filter for high speed data communications over differential signal lines, comprising:
    signal splitting means to split signals transmitted from a first port connected to a first line of a pair of differential signal lines and a second port connected to a second line of the pair of differential signal lines;
    phase shifting means communicating with the signal splitting means to invert one of each of the split signals;
    signal combining means communicating with the signal splitting means and the phase shifting means to combine the inverted signals from each of the first and second ports with the split signals from the other of the first and second ports to provide combined signals, thereby attenuating common mode signals carried on the pair of differential signal lines, and to transmit the combined signals to third and fourth ports.

2. The common mode filter of claim 1, wherein the signal splitting means and the signal combining means are implemented as single functional blocks.

3. The common mode filter of claim 2, wherein the single functional blocks are junctions between a plurality of slot-lines, shorted at both ends, and the pair of differential signal lines, and wherein each said shorted slot-line provides phase-shifting at a different common mode discrete frequency.

4. The common mode filter of claim 2, wherein the single functional blocks are junctions between a slot-line shorted at both ends and the pair of differential signal lines.

5. The common mode filter of claim 4, wherein the slot-line is formed in a ground plane.

6. The common mode filter of claim 4, wherein the pair of differential signal lines are strip-lines.

7. The common mode filter of claim 4, wherein the pair of differential signal lines are microstrip lines.

8. The common mode filter of claim 4, wherein the shorted ends of the slot-line provide the phase shifting means.

9. The common mode filter of claim 8, wherein the shorted ends of the slot-line appear as an effective slot-line open to the common mode signals.

10. The common mode filter of claim 8, wherein the shorted ends of the slot-line have a length equal to one quarter wavelength of a common mode discrete frequency.

11. The common mode filter of claim 10, wherein the shorted ends of the slot-line are one of circular stubs, radial stubs or diamond stubs.

12. The common mode filter of claim 1, wherein the phase shifting means are balanced-to-unbalanced (BALUN) transformers connected to a differential signal driver.

13. The common mode filter of claim 1, wherein at least one of the signal splitting means, the phase shifting means and the signal combining means is implemented in a digital signal processor.

14. A high speed communication system using differential transmission lines, comprising:
- a differential input driver driving a pair of differential signal lines; and
- a common mode filter having a signal splitter to split signals transmitted from a first port connected to a first line of the pair of differential signal lines and a second port connected to a second line of the pair of differential signal lines; a phase shifter communicating with the signal splitter to invert one of each of the split signals; and a signal combiner communicating with the signal splitter and the phase shifter to combine the inverted signals from each of the first and second ports with the split signals from the other of the first and second ports to provide combined signals, thereby attenuating common mode signals carried on the pair of differential signal lines, and to transmit the combined signals to third and fourth ports.

15. A method of filtering common mode signals in high speed data communications over differential signal lines, comprising:
- splitting signals transmitted from a first port connected to a first line of a pair of differential signal lines and a second port connected to a second line of the pair of differential signal lines;
- inverting one of each of the split signals;
- combining the inverted signals from each of the first and second ports with the split signals from the other of the first and second ports to provide combined signals, thereby attenuating common mode signals carried on the pair of differential signal lines, and
- transmitting the combined signals to third and fourth ports.

* * * * *